(12) United States Patent
Schoenfeld et al.

(10) Patent No.: US 11,364,925 B2
(45) Date of Patent: Jun. 21, 2022

(54) METHOD FOR THE SELF-CHECK OF DRIVING FUNCTIONS OF AN AUTONOMOUS OR SEMI-AUTONOMOUS VEHICLE

(71) Applicant: Robert Bosch GmbH, Stuttgart (DE)

(72) Inventors: Daniel Schoenfeld, Abstatt (DE); Marlon Ramon Ewert, Untergruppenbach (DE); Stefanie Schoenfeld, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 502 days.

(21) Appl. No.: 16/020,315

(22) Filed: Jun. 27, 2018

(65) Prior Publication Data
US 2019/0001989 A1 Jan. 3, 2019

(30) Foreign Application Priority Data
Jun. 28, 2017 (DE) .......................... 102017210859.2

(51) Int. Cl.
*B60W 50/04* (2006.01)
*B60W 60/00* (2020.01)
(Continued)

(52) U.S. Cl.
CPC ........ *B60W 50/04* (2013.01); *B60W 50/0205* (2013.01); *B60W 50/0225* (2013.01); *B60W 60/00186* (2020.02); *G06F 11/1441* (2013.01); *B60W 60/0018* (2020.02); *B60W 2050/007* (2013.01); *B60W 2050/021* (2013.01);
(Continued)

(58) Field of Classification Search
CPC ............. B60W 50/04; B60W 50/0205; B60W 2050/007; B60W 2050/0215; B60W 2050/041; B60W 2050/046; B60W 50/12; B60W 2050/0073; B60W 2050/0083; B60W 50/0225; B60W 60/00186; B60W 60/0018; B60W 2050/021; B60W 50/029;
(Continued)

(56) References Cited

U.S. PATENT DOCUMENTS 8,306,783 B2 * 11/2012 Duc ................... G05B 23/0251
702/185
8,791,803 B2 * 7/2014 Ishikawa ............. G01M 15/042
340/438

(Continued)

FOREIGN PATENT DOCUMENTS

JP 2007046546 A * 2/2007 ............ F02N 11/108

OTHER PUBLICATIONS

English translation: Tabuchi, JP 2007046546 A, Feb. 2007, Japenese Patent Publication (Year: 2007).*

*Primary Examiner* — Nadeem Odeh
(74) *Attorney, Agent, or Firm* — Norton Rose Fulbright US LLP; Gerard Messina

(57) ABSTRACT

A method for the self-check of at least one driving function of an autonomous or semi-autonomous vehicle in vehicle operation, after an error message about the at least one driving function, in which in one step, at least one vehicle electronic system and/or at least one sensor is/are restarted, a check is made for a further appearance of the error message after each restart, and in the event an error message is not repeated after the restart, the driving function in question is checked during operation of the autonomous or semi-autonomous vehicle.

19 Claims, 1 Drawing Sheet

(51) Int. Cl.
  *B60W 50/02* (2012.01)
  *G06F 11/14* (2006.01)
  *B60W 50/00* (2006.01)

(52) U.S. Cl.
  CPC .............. *B60W 2050/0215* (2013.01); *B60W 2050/041* (2013.01)

(58) Field of Classification Search
  CPC ......... B60W 50/045; B60W 2050/0295; G06F 11/1441; G06F 11/1438
  See application file for complete search history.

(56) References Cited

U.S. PATENT DOCUMENTS

| | | | | |
|---|---|---|---|---|
| 8,924,071 | B2* | 12/2014 | Stanek | G06Q 10/10 701/31.4 |
| 2006/0241831 | A1* | 10/2006 | Watanabe | B60W 50/0205 702/185 |
| 2011/0046842 | A1* | 2/2011 | Smith | G07C 5/008 701/31.4 |
| 2013/0218400 | A1* | 8/2013 | Knoop | G06F 17/00 701/31.4 |
| 2014/0365062 | A1* | 12/2014 | Urhahne | B60T 7/14 701/23 |
| 2015/0258999 | A1* | 9/2015 | Jiang | B60W 50/029 701/29.2 |
| 2016/0034363 | A1* | 2/2016 | Poledna | G05B 19/0428 714/4.2 |
| 2018/0011485 | A1* | 1/2018 | Ferren | G05D 1/0061 |
| 2018/0050704 | A1* | 2/2018 | Tascione | B60W 10/04 |
| 2018/0297610 | A1* | 10/2018 | Fischer | B60R 16/0238 |
| 2018/0329419 | A1* | 11/2018 | Adams | B62D 15/025 |

\* cited by examiner

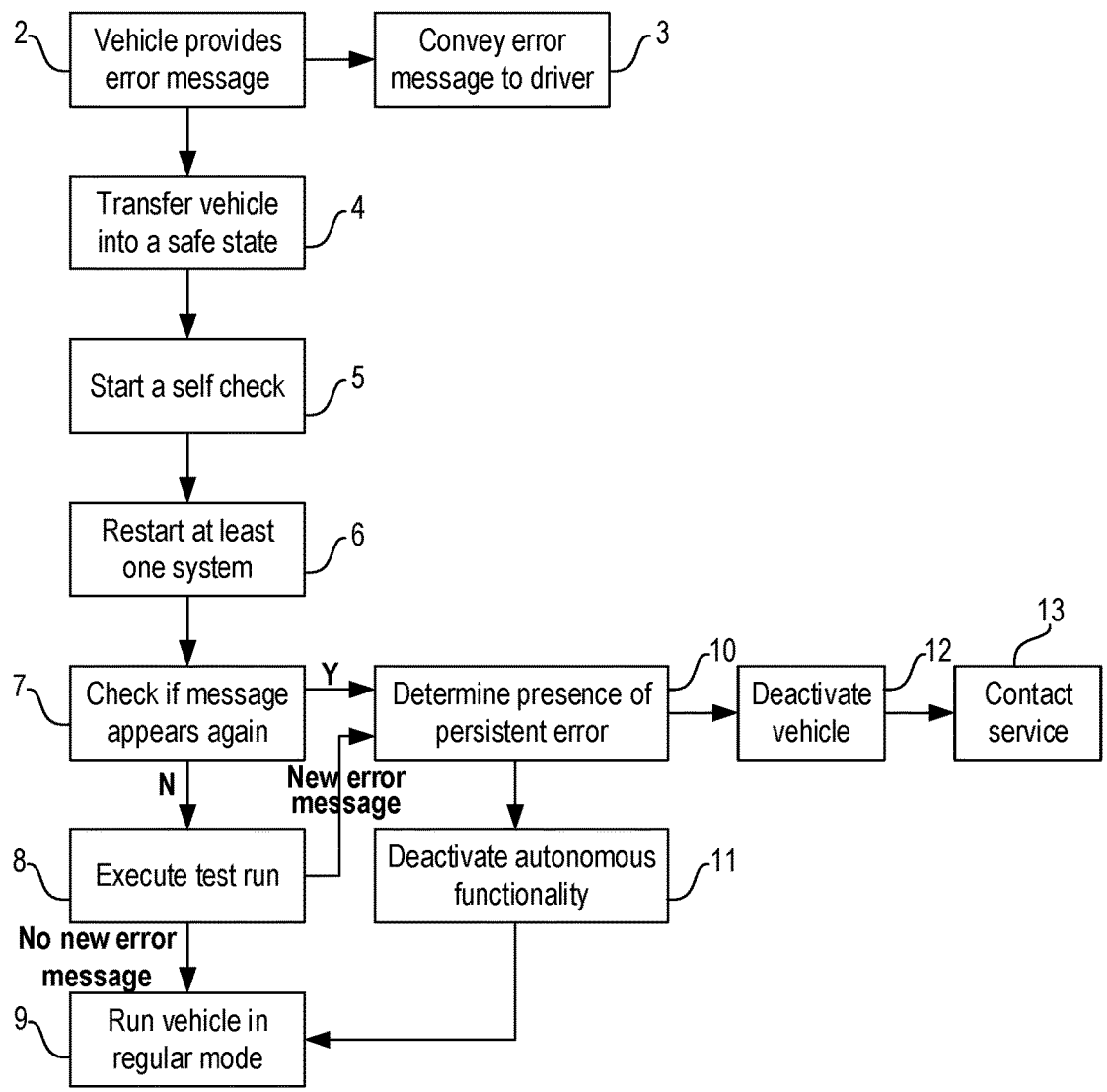

METHOD FOR THE SELF-CHECK OF DRIVING FUNCTIONS OF AN AUTONOMOUS OR SEMI-AUTONOMOUS VEHICLE

RELATED APPLICATION INFORMATION

The present application claims priority to and the benefit of German patent application no. 10 2017 210 859.2, which was filed in Germany on Jun. 28, 2017, the disclosure which is incorporated herein by reference.

FIELD OF THE INVENTION

The present invention relates to a method for the self-check of at least one driving function of an autonomous or semi-autonomous vehicle in vehicle operation, after an error message about the at least one driving function.

BACKGROUND INFORMATION

Autonomous vehicles are able to manage without an action on the part of a driver and, for example, recognize a course of a road, other road users or obstacles independently. In so doing, the vehicle is able to adapt independently to the specific traffic situation and to travel a predefined route. In addition to autonomous vehicles, semi-autonomous vehicles are also familiar, which are able to assist the driver in certain driving situations. For instance, these vehicles include intelligent cruise controls, emergency braking assistance systems or lane-keeping functions.

Various errors, e.g., hardware and/or software errors, may occur during the operation of an autonomous or semi-autonomous vehicle. If a particular error message is present, autonomous or semi-autonomous vehicles are transferred into a safe state and, for example, come to a stop on a shoulder of the road. For instance, the safe state may be a state of the vehicle with minimal risk for the occupants. For that purpose, the vehicle may be parked in an emergency rest stop, for example, or in a parking area. However, the vehicle may also be operated in a safe state at a low speed, e.g., on a shoulder or in a truck lane. In this case, the safe state is maintained until the error is rectified on-site or the vehicle has been towed away for repair. As a result, greater downtimes and unnecessary repair costs may come about even in the case of minor malfunctions that have no effect on driving safety, or in the case of error messages appearing only once or appearing mistakenly.

SUMMARY OF THE INVENTION

The object of the present invention may be seen in the provision of a method for the self-check of an autonomous or semi-autonomous vehicle after an error message has appeared, which is able to shorten the downtime of a vehicle and prevent avoidable repair costs.

This objective may be achieved with the aid of the subject matter of the respective descriptions herein. Advantageous developments of the invention are the subject matter of the respective further descriptions herein.

According to one aspect of the invention, a method is provided for the self-check of at least one driving function of an autonomous or semi-autonomous vehicle in vehicle operation, after an error message about the at least one driving function. In a first step, at least one electronic system of the vehicle and/or at least one sensor is/are restarted. According to a further step, after the restart, a check is made for a repeated or further appearance of the error message. In the event an error message does not appear again after the restart, the driving function in question is subsequently checked during the operation of the autonomous or semi-autonomous vehicle.

Various errors may lead to a breakdown or partial breakdown of an autonomous or semi-autonomous vehicle. In particular, hardware or software errors that are sporadic or occur one time may lead to serious failures or malfunctions of the vehicle. For instance, these may be short-term impairments of a communication of the vehicle with other vehicles or an infrastructure. Another reason for such errors may also be failures of driving-environment sensors. Sometimes the errors appear only one time, and after the vehicle electronic system or the relevant sensors and actuators of the autonomous vehicle have been restarted, are able to be eliminated. By eliminating the errors in the form of a selective restart, autonomous or semi-autonomous vehicles are able to be operated again after a relatively brief downtime.

If an error in the form of an error message appears again after the intended components have been restarted, a sporadic error may be ruled out. Namely, the repeated appearance of an error message means that substantial diagnostic and/or repair work is necessary. For that, with the aid of a communication interface of the vehicle, a breakdown service may be contacted, for example.

In the event that after at least one restart of at least one vehicle electronic system and/or at least one sensor, the error message does not appear again, it may be concluded or interpreted that the error was a sporadic error. In order to ensure the complete functionality of the vehicle, a test operation is subsequently carried out which checks the functions involved in the error message for a repeated appearance of the errors during operation of the vehicle. In addition, in so doing, the relevant vehicle functions affected by the error message may be employed selectively and thereby tested. If further error messages regarding these functions fail to appear, operation may be continued. Otherwise, a defect must be assumed, and the autonomous or semi-autonomous vehicle is transferred into a safe state. Depending on the vehicle function affected by the error, alternatively, the autonomous or semi-autonomous functions may also be deactivated, so that the vehicle remains controllable manually. A limited operation of the vehicle may thus be allowed. Sporadic errors are able to be identified by the method and rectified in optimal manner by at least one restart of the responsible sensor system and/or electronic system. In particular, using the method, an autonomous or semi-autonomous vehicle is able to perform a self-check. As a consequence, unnecessary use of a breakdown service and a longer loss of the vehicle caused by it may be prevented.

According to one exemplary embodiment of the method, the check of the vehicle electronic system and/or the at least one sensor includes at least one of the following steps:

Switching a vehicle ignition off and on,
Restarting at least one control device,
Restarting at least one peripheral and/or at least one sensor,
Checking at least one vehicle actuator,
Communicating with a server unit off-board or a server unit on-board the vehicle to perform an error diagnosis.

The aim of the steps indicated is first of all to discover or to locate the error in the autonomous or semi-autonomous vehicle, in a manner that the vehicle itself or an external server unit performs a diagnosis using the above steps. For example, an external server unit here may be a cloud, which is able to be contacted via a car-2-X communication. The steps indicated may be carried out one after the other or in any sequence until the error message does not appear again. If, after going through all the steps, the error message should nevertheless remain, a persistent error or a defect may be assumed. Consequently, the vehicle remains in a safe state only if a defect is present.

According to a further exemplary embodiment of the method, the autonomous or semi-autonomous vehicle is transferred into a safe state prior to or during the check of the driving function. For instance, the diagnosis of the error in the autonomous vehicle or in an external server unit may be carried out during a braking procedure for transferring the vehicle into a safe state. Alternatively or additionally, the vehicle may be operated with a low speed on a shoulder, while the method or a self-test is being carried out. For instance, this may take place when the basic functionality of the autonomous or semi-autonomous vehicle is still available, so that the vehicle does not have to be brought to a complete standstill for the error diagnosis. Alternatively, in the case of at least one of the steps carried out for checking an error, the vehicle may also be brought to a stop on a shoulder or at an emergency rest stop.

If, upon carrying out the indicated steps, an error message does not appear again, in order to verify safe operation and to rule out any danger to other road users, the autonomous driving function which is affected by the recognized error may first of all be tried out at slow speed on the shoulder, before the vehicle enters again into road traffic. Alternatively or additionally, the vehicle may initially be operated for a defined time with a low speed. To that end, for example, the vehicle may be operated in a right traffic lane with a speed adapted to a preceding truck. In this manner, it is possible to check whether the eliminated error occurs again during operation.

According to a further exemplary embodiment of the method, the error message is produced by at least one in-vehicle error, and a degree of severity is assigned to the at least one in-vehicle error. Thus, the error signaled by the error message may be evaluated. In particular, by assigning a degree of severity, it is possible to assess how critical the recorded error is.

According to another exemplary embodiment of the method, after the in-vehicle error has been eliminated, operational readiness of the autonomous or semi-autonomous vehicle is tested at a low speed on a shoulder or in a right traffic lane. Thus, an additional test of the vehicle may be carried out, which is able to reduce a risk to other road users and increase the safety of occupants of the autonomous or semi-autonomous vehicle, as well. In so doing, the vehicle may be operated with an adjusted speed in such a way that the vehicle represents no traffic obstruction for other road users owing to this behavior. Alternatively or additionally, the vehicle may drive with low speed up to the next parking area and carry out a diagnosis or the method there, provided it is a question of an error with a low degree of severity. Taking the degree of severity of the error into account, a control unit of the vehicle may subsequently judge whether it is expedient and safe to drive up to the parking area. This decision may be communicated to the driver of the vehicle, or an input or action by the driver may be requested for the final decision.

According to another advantageous exemplary embodiment of the method, depending on a degree of severity of the in-vehicle error, the autonomous or semi-autonomous vehicle is deactivated during the check of the error message. If the sporadic error exceeds a certain degree of severity, the driving function involved may also be deactivated after the vehicle electronic system has been restarted, until the vehicle has been repaired by a repair service. In the case of a serious error, for example, only the repair service may enable the driving function again after the repair. Alternatively or additionally, such an enablement of at least one driving function may be carried out externally like, for instance, by way of a cloud. This may likewise be accomplished by a repair service, for example, which is able to establish a communication link to the vehicle. In this connection, the deactivation may also be limited to defined functions like, e.g., autonomous driving or a brake assist system, and does not necessarily have to affect the roadworthiness of the vehicle.

According to another exemplary embodiment of the method, depending on a degree of severity of the in-vehicle error, the autonomous or semi-autonomous vehicle is switched to a manual operating state during the check of the error message. The autonomous or semi-autonomous function may thus be deactivated in the case of an error. In doing so, the vehicle may be switched to the manual mode. In the manual mode, the driver may continue his trip or head to a parking area.

According to another exemplary embodiment of the method, an error diagnosis of the driving function is performed during a normal vehicle operation. In this instance, the error diagnosis may already be performed continuously or at defined time intervals during a normal operation of the vehicle. This offers the advantage that errors are recognized immediately, and the vehicle may be transferred even more quickly into a safe state. In this case, the respective driving function may run in a shadow register of a control unit of the vehicle, and the results of the error diagnosis may be compared in the vehicle itself or on the external server unit, to a desired behavior.

According to a further exemplary embodiment of the method, upon communicating with an off-board server unit, a repair service or a towing service is contacted. If a critical error or an error with a high degree of severity is recorded, a repair service and/or towing service may be contacted. To that end, the vehicle may transmit a corresponding request via a car-2-X communication link to the external server unit, and from there, be transferred to a repair service and/or towing service. If the error diagnosis takes place in the cloud or the external server unit, the recognized error may also be communicated directly by the off-board server unit to the repair and/or towing service. Furthermore, additional information like, e.g., a position of the vehicle, information concerning the vehicle type, a vehicle version, a version of a vehicle component and a result of the error diagnosis may be transmitted to the repair and/or towing service. The service may subsequently go to the autonomous vehicle and, if possible, perform the necessary repair directly on the vehicle. If an immediate repair of the vehicle is not possible, the autonomous vehicle may be hauled into a garage.

However, if the error was able to be rectified immediately on the autonomous vehicle by a repair and/or towing service, in order to check its functions, the vehicle may travel a defined distance at a speed adapted to a slower road user, before regular operation is started.

According to a further advantageous exemplary embodiment of the method, several components are monitored continuously by a server unit on-board or a server unit off-board the vehicle. In this way, immediate and continuous ascertainment of a component wear and tear, e.g., in the form of a drift analysis, may be carried out. For example, voltage characteristic, power consumption, coefficients of friction, pedal pressure, braking distance, torques and the like may be monitored. A corresponding evaluation may be carried out within the vehicle or on the external server unit. The actual state may be compared to a desired state. As soon as the actual state exceeds a certain setpoint value, the corresponding component may be deactivated early on, so that a repair may be made as quickly as possible.

In particular, consequential errors or consequential defects may thus be prevented. Alternatively or additionally, component wear and tear may be compared to the failure numbers of further vehicles that communicate with the external server unit. A suitable comparison with the failed components of the further vehicles may supply information for a prediction as to when a corresponding component in the ego vehicle could fail, or that a danger for a failure exists.

According to a further exemplary embodiment of the method, an error diagnosis performed on the off-board server unit is transmitted to the repair service or the towing service. In this case, results of a diagnosis carried out off-board the vehicle may be transmitted directly to a preferred service provider, which subsequently may contact the driver of the vehicle transferred into a safe state, and coordinate the further steps. Particularly in the case of a persistent or critical error, this may accelerate a process for the repair or towing of the vehicle.

According to another exemplary embodiment of the method, an error diagnosis is performed by the server unit off-board or the server unit on-board the vehicle on the basis of at least one diagnostic algorithm. For example, the algorithm may carry out or have at least one of the following steps:

Performing a data comparison of an expected function to an actual function,

Evaluating specific error codes of the autonomous or semi-autonomous vehicle,

Evaluating the measured values or error codes stored in a memory,

A hex code of a driving function may be executed or simulated in the vehicle and/or on the external server unit in parallel with sample data or sample calls. For example, if the deviations on the vehicle and in the external server unit are identical, software errors are able to be detected. On the other hand, if the parallel calculation results differ from each other, then a hardware error may be present, Evaluating actuator controls of the vehicle.

Hereinafter, an exemplary embodiment of the present invention is explained in greater detail on the basis of a schematic representation.

BRIEF DESCRIPTION OF THE DRAWING

The FIGURE shows schematically a functional sequence of a method 1 for the self-check according to one specific embodiment of the invention.

DETAILED DESCRIPTION

The FIGURE shows schematically a functional sequence of a method 1 for the self-check according to one specific embodiment of the invention.

In a first step, an error message 2 is provided by the autonomous or semi-autonomous vehicle. The error message may be conveyed 3 to a driver of the vehicle in the form of a display. Depending on the error and especially a degree of severity of the error, the vehicle may be transferred into a safe state 4.

To that end, the vehicle is decelerated and brought to a standstill on a shoulder. During this process 4, a self-check 5 may already be started. Alternatively or additionally, self-check 5 may also be carried out only after the vehicle has come to a stop. During the self-check, at least one vehicle electronic system and/or at least one sensor is/are restarted 6. Subsequently, it is checked whether the error message appears again 7. In this context, at least one vehicle electronic system and/or at least one sensor is/are restarted 6, and the process of checking whether the error message appears again 7 is carried out component by component and in succession or iteratively. In this way, each system or each function may be checked. The process of checking 7 may be carried out here both by the vehicle itself using a server unit on-board the vehicle or by a server unit off-board the vehicle. For example, if an error no longer appears after a restart, then it may be concluded that the last restarted system or unit caused the error. In this case, the method may be continued and the vehicle may undergo a test run 8 with respect to its autonomous or semi-autonomous functions at a low speed. If, after a defined time or distance, no new error message is determined, the autonomous or semi-autonomous vehicle may be operated in a regular operating mode again 9. On the other hand, if a renewed error message is recognized, a sporadic error may be ruled out, and a persistent error or a technical defect is present 10. Similarly, a persistent error or a technical defect 10 may be interpreted if the error message continues to exist after all relevant components have been checked 6, 7. In such a case, for instance, the autonomous or semi-autonomous function of the vehicle may be deactivated 11, so that the vehicle can only be operated manually. Depending on a degree of severity of the error, however, the vehicle may also be deactivated 12 and a repair service and/or towing service may be contacted 13.

What is claimed is:

1. A self-check function-diagnostic method for an autonomous or semi-autonomous vehicle, the method comprising:
in response to an initial generation of an error message during operation of the autonomous or semi-autonomous vehicle, the error message indicating occurrence of an error, performing steps to identify which of a plurality of functions of the autonomous or semi-autonomous vehicle is a source of the occurrence of the error, the steps including the following steps (a)-(c) all as a single unit, the single unit of the steps being performed in its entirety for each respective one of at least a subset of the plurality of functions, in consecutive iterations function by function so that each respective one of the iterations of the performance of the entire single unit of the steps, other than a first one of the iterations, begins after completion of another one of the iterations that immediately precedes the respective iteration, until the source is identified:
  (a) switching the respective function off, while others of the plurality of functions remain operational;
  (b) subsequent to the switching off of the respective function, restarting the respective function; and
  (c) determining whether the error message is present after the restart, the respective function being identified as the source by a result of the determination being that the error message is not present after the restart; and
responsive to the identification of the source, selecting a further operation to perform and performing the further operation;

wherein the method is performed in an instance in which the source is not identified in the first one of the iterations so that the at least the subset of the plurality of functions includes at least two of the plurality of functions.

2. The method of claim 1, wherein the initial generation of the error message is produced by at least one in-vehicle error, and the method further comprises assigning a degree of severity to the at least one in-vehicle error.

3. The method of claim 1, wherein depending on a degree of severity of the error indicated by the error message, the autonomous or semi-autonomous vehicle is deactivated during the performance of the steps to identify which of the plurality of functions of the autonomous or semi-autonomous vehicle is the source of the occurrence of the error indicated by the error message.

4. The method of claim 1, wherein depending on a degree of severity of the error indicated by the error message, the autonomous or semi-autonomous vehicle is switched to a manual operating state during which the steps to identify which of the plurality of functions of the autonomous or semi-autonomous vehicle is the source of the error indicated by the error message are performed.

5. The method of claim 1, wherein the further operation includes communicating with an off-board server unit, by which a repair service or a towing service is contacted.

6. The method of claim 1, wherein the further operation includes initiating performance of an error diagnosis by an off-board server unit that transmits a result of the error diagnosis to a repair service or a towing service.

7. The method of claim 1, wherein the further operation includes initiating performance of an error diagnosis by a server unit that is off-board of the autonomous or semi-autonomous vehicle or on-board the autonomous or semi-autonomous vehicle while the autonomous or semi-autonomous vehicle is prevented from driving above a predefined threshold.

8. The method of claim 1, wherein the further operation includes initiating performance of an error diagnosis by a server unit that is off-board of the autonomous or semi-autonomous vehicle or on-board the autonomous or semi-autonomous vehicle using at least one diagnostic algorithm.

9. The method of claim 1, wherein the further operation is a test of one or more of the functions that has been involved in or affected by the error.

10. The method of claim 9, further comprising, responsive to a result of the test being that the error message is regenerated, deactivating the one or more of the functions that has been involved in or affected by the error.

11. The method of claim 9, further comprising, responsive to a result of the test being that the error message is regenerated, deactivating an autonomous driving by the autonomous or semi-autonomous vehicle.

12. The method of claim 9, further comprising, responsive to a result of the test being that the error message is regenerated, deactivating the autonomous or semi-autonomous vehicle.

13. The method of claim 9, wherein the test of the one or more of the functions that has been involved in or affected by the error is performed while the autonomous or semi-autonomous vehicle is in a safe mode.

14. The method of claim 13, further comprising, responsive to a result of the test being that the error is not regenerated by the performance of the test, removing the autonomous or semi-autonomous vehicle from the safe mode.

15. The method of claim 13, wherein maintaining the autonomous or semi-autonomous vehicle in the safe mode during the performance of the test of the one or more of the functions that has been involved in or affected by the error is dependent on a severity of the error.

16. The method of claim 9, wherein the test of the one or more of the functions that has been involved in or affected by the error is performed while the autonomous or semi-autonomous vehicle is prevented from driving above a predefined threshold speed.

17. The method of claim 1, further comprising placing the autonomous or semi-autonomous vehicle into a safe mode in response to the initial generation of the error message, wherein the steps to identify which of the plurality of functions of the autonomous or semi-autonomous vehicle is the source of the occurrence of the error are performed while the autonomous or semi-autonomous vehicle is in the safe mode.

18. The method of claim 17, wherein the further operation is a test of one or more of the functions that has been involved in or affected by the error, and the method further comprises, responsive to a result of the test being that the error is not regenerated by the performance of the test, removing the autonomous or semi-autonomous vehicle from the safe mode.

19. A method for an autonomous or semi-autonomous vehicle, the method comprising:
  in response to an initial generation of an error message during operation of the autonomous or semi-autonomous vehicle, the error message indicating occurrence of an error, executing steps in an attempt to identify which of a plurality of functions of the autonomous or semi-autonomous vehicle is a source of the occurrence of the error, the steps including the following steps (a)-(c) all as a single unit, the single unit of the steps being performed in its entirety for each respective one of the plurality of functions, in consecutive iterations function by function so that each respective one of the iterations of the performance of the entire single unit of the steps, other than a first one of the iterations, begins after completion of another one of the iterations that immediately precedes the respective iteration:
    (a) switching the respective function off, while others of the plurality of functions remain operational;
    (b) subsequent to the switching off of the respective function, restarting the respective function; and
    (c) determining whether the error message is no longer present after the restart as an indication of the respective function being the source; and
  responsive to the steps executed in the attempt to identify which of the plurality of the functions of the autonomous or semi-autonomous vehicle is the source of the occurrence of the error being completed for all of the plurality of functions without any of the plurality of functions being indicated to be the source, changing a mode of operation of the autonomous or semi-autonomous vehicle.

* * * * *